April 29, 1969     L. G. AMOS     3,441,250

FLUID OPERATED INTERMITTENT DRIVE MECHANISM

Filed Sept. 15, 1967

INVENTOR
LYNN G. AMOS

BY

ATTORNEYS

United States Patent Office 3,441,250
Patented Apr. 29, 1969

3,441,250
FLUID OPERATED INTERMITTENT DRIVE MECHANISM
Lynn G. Amos, Cary, N.C., assignor to Corning Glass Works, Corning, N.Y., a corporation of New York
Filed Sept. 15, 1967, Ser. No. 667,967
Int. Cl. F03b *17/06*
U.S. Cl. 253—36                                      5 Claims

ABSTRACT OF THE DISCLOSURE

A fluid operated intermittent drive device having fluid jets directed transversely against a slack belt trained about a pair of capstans to rotate said capstans through predetermined increments.

Background of the invention

Figure 1:
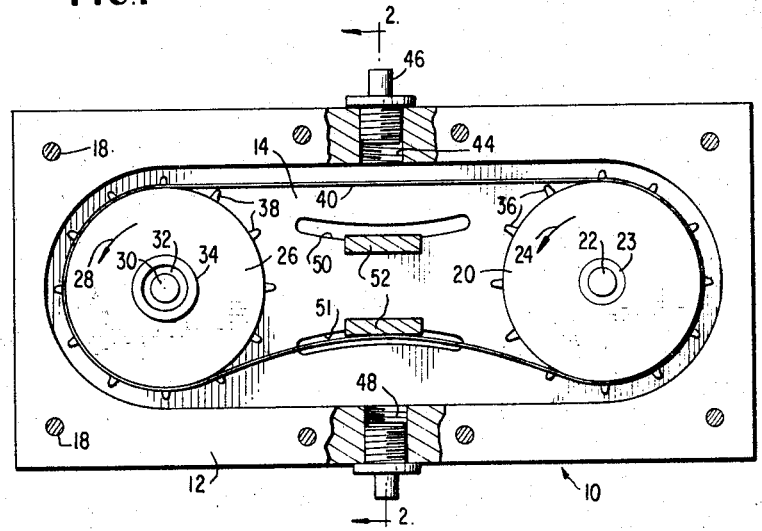

In prior art devices where it was desired to obtain an intermittent rotation of a shaft, the most common manner of achieving this was through the conversion of reciprocating mechanical motion by means of a pawl and ratchet mechanism into the intermittent rotary movement of the shaft member. Such devices, however, were often very cumbersome and the sudden reversal of forces involved in the reciprocating movement of a mechanical part often caused undue vibrations detrimental to the operation of sensitive devices.

An example of a prior art device utilizing the conversion of reciprocating motion to intermittent rotary motion is the patent to Swift 699,774. In this patent a pair of sprocket wheels are provided with an endless sprocket chain E trained thereabout. The rim portion of one of the sprocket wheels is coupled to a concentric drum portion of the sprocket wheel by means of a one-way clutch mechanism. A rod S is reciprocated by means of a steam engine or other suitable source of power along a path substantially tangent to the periphery of the sprockets with an end of the rod being secured to the sprocket chain at a point intermediate to the sprocket wheels. Upon reciprocation of the rod S in one direction the rim of the sprocket wheel will be driven by the sprocket chain and the rim will rotate freely relative to the drum. Upon reciprocation of the rod F in the opposite direction the drum and rim will be connected together by the one-way clutch mechanism and the movement of the sprocket chain will be imparted to the rim and drum of the sprocket wheel thereby providing an intermittent uni-directional rotation to the shaft of the sprocket wheel.

The present invention provides an intermittent uni-directional drive without the use of a reciprocating mechanical drive mechanism.

The device of the present invention provides a simple, rugged, jerk-free intermittent drive action and provides an extremely high mechanical advantage.

In the operation of the present device a pair of alternating intermittent fluid jets are utilized as the source of power thereby making the use of this device extremely compatible a system incorporating fluidic flip-flop devices.

Summary of the invention

An intermittent drive mechanism comprising a housing, recess means formed in said housing, first capstan means journaled in said housing recess means for uni-directional rotation, second capstan means journaled in said housing recess means for uni-directional rotation similar to said first capstan means, flexible endless tape means looped loosely over said capstans and drivingly connected thereto, first and second fluid port means disposed in said housing intermediate said capstans, each of said fluid port means being disposed along respective parallel lines tangent to the peripheries of said capstans and disposed in opposing relation to each other, and exhaust port means disposed intermediate said capstans adjacent to and on opposite sides of the center line between said two capstans.

Other features of the invention will be pointed out in the following description and claims and illustrated in the accompanying drawings, which disclose, by way of example, the principles of the invention and the best mode which has been contemplated of applying those principles.

Figure 3:
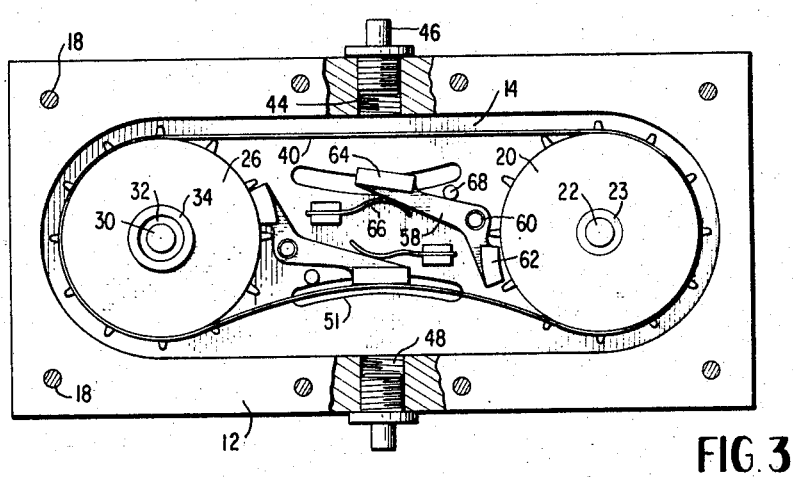
Figure 2:
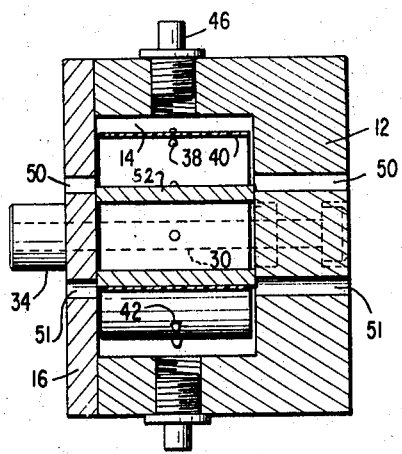

In the drawings:
FIG. 1 is a side elevational view, partly on section, of the intermittent drive mechanism;
FIG. 2 is a sectional view along the line 2—2 of FIG. 1; and.
FIG. 3 is a side elevational view similar to that of FIG. 1 showing a modified construction.

Turning now to a detailed description of the invention the intermittent drive mechanism is generally designated by the numeral 10 in FIG. 1. The mechanism is comprised of a main block 12 which is substantially oblong in shape. The block 12 may be made of any suitable material such as plastic, glass, metal or the like. The block 12 is formed with a substantially rectangular recess 14 disposed in one side of the block. The recess 14 may be covered by a plate 16 of any suitable material, as for example, transparent plastic which is substantially coextensive with the entire side of the block 12. The cover plate 16 may be secured to the block 12 by any suitable means 18 such as rivets, screws or the like. A first capstan 20 is rotatably journaled in one end of the recess for unidirectional rotation within said recess on an axis per pendicular to the cover plate 16. The capstan may be rotatably mounted on a stub shaft 22 rigidly secured in the block 12. Any suitable one-way clutch mechanism 23 may be disposed between the capstan and the stub shaft so that the capstan 20 will be capable of rotation in the direction of the arrow 24 only.

A second capstan 26 is roatably journaled in the opposite end of the recess 14 for unidirectional rotation in the direction of the arrow 28. Therefore, the capstan 26 is arranged for rotation in the same direction as the direction of rotation of the capstan 20. A stub shaft 30 is rigidly secured to the block 12 and a suitable one-way clutch mechanism 32 is disposed intermediate the stub shaft 30 and the interior surface of the capstan 26. The capstan 26 is provided with an axially protruding flange 34 which extends outwardly through the cover plate 16. The flange 34 may be connected to any suitable driven element which requires an intermittent uni-directional drive.

The capstans 20 and 26 are provided with a plurality of pins 36 and 38 respectively which are radially disposed about the periphery of the capstans. An endless belt 40 is loosely entrained about the peripheries of the capstans 20 and 26 and is provided with a plurality of perforations 42 which are adapted to cooperate with the drive pins 36 and 38.

A first fluid port 44 is formed through the upper wall of the block 12 and communicates with the recess 14 adjacent the central portion thereof. A second fluid port 48 is disposed in the lower wall of block 12. A suitable connector fitting 46 may be disposed in each fluid port 44 and 48 for connection to any suitable source of fluid under pressure. The port 48 is in direct communication with the recess 14 and is located exactly opposite the port 44. The points of intersection of the ports 44 and 48 with the recess 14 are disposed adjacent to the parallel lines respectively which are tangent to the peripheries of the capstans 20 and 26. The jets of fluid which enter the recess 14 from the ports 44 and 48 impinge directly and perpendicularly upon the sections of the tape 40 extending between the two capstans.

A pair of exhaust ports 50 and 51 are disposed intermediate the two capstans in the front and rear walls of the block 12. Each of these ports 50 and 51 may have an arcuate configuration as shown in FIG. 1 corresponding to the arcuate configuration of the tape loop when it reaches its innermost position. A pair of friction blocks 52 extend transversely of the recess 14 and are secured to the block 12. The friction blocks 52 partially overlap the lower portions of the exhaust ports 50 and 51 for the reason set forth hereinafter.

According to the operation of the above described device, the device will index the flange 34 to a predetermined angle when a fluidic signal is received. The power for the indexing action is supplied by the output of one or more fluidic flip-flops (digital bistable devices). The specific fluidic flip-flops have not been shown since they are not part of the present invention but the use of such flip-flops is well known in the art for controlling pulses of fluid, such as air or the like.

Assuming the use of air, for example, when the air flows through the port 48, the slack belt or tape 40 will be forced inwardly to the position as shown in FIG. 1. If the flow of air were now switched from port 48 to port 44 it would exert a force on the flexible tape 40 directly below it. The force on the tape would in turn exert the clockwise torque on capstan 26 and a counterclockwise torque on capstan 20. Since capstan 20 is arranged for rotation in the counterclockwise direction the capstan 20 will rotate until the tape 40 reaches the port 50. At this point the opposite section of the tape 40 will be stretched taut between the two capstans and the section of the tape adjacent the port 50 will be deflected down far enough to allow the air to pass out through the exhaust port 50. Thus the angle of rotation of the capstan is easily predictable and highly repeatable since the looseness of the tape determines the indexing angle of the output member. The block 52 may be provided with a friction surface and the tape will bear against the block 52 and be restrained from any excess overriding movement due to inertia.

The device is then returned to the original state as shown in FIG. 1 by switching the flow of air back to port 48. When this is done capstan 20 now remains stationary and capstan 26 rotates counterclockwise until the tape adjacent the port 44 is again stretched tight as shown in FIG. 1.

It is also contemplated within the scope of the present invention that an output shaft could also be connected to the capstan 20 so that two intermittent uni-directional outputs could be obtained from the present mechanism.

A modified form of a tape movement limiting device is shown in FIG. 3. According to the modified construction the stationary blocks 52 as shown in FIG. 1 are removed and replaced by pivoted levers 58. Since the two lever constructions are identical only one will be described. The lever 58 is pivoted in the recess 14 on a stationary pin 60 intermediate the ends of the lever. One end of the lever 58 is provided with a friction pad 64 which is adapted to be contacted by the tape 40 as it moves toward the exhaust port 50. The opposite end of the lever is provided with an arcuate friction pad 62 adapted to contact the periphery of the capstan 20. The lever 58 is normally biased by a spring 66 to the position shown in FIG. 3, so that the friction pad 62 is out of contact with the capstan 20. Thus when fluid under pressure is admitted through port 44, the tape 40 will move downwardly as viewed in FIG. 3 into contact with the pad 64 on the lever 58. The force of the fluid pressure on the tape 40 will cause the lever 58 to pivot against the force of spring 66 until the fluid pressure is permitted to exhaust through port 50 and the friction pad 62 engages capstan 20.

Obviously, many modifications and variations of the present invention are possible in the light of the above teachings. It is, therefore, to be understood that within the scope of the appended claims, the invention may be practiced otherwise than as specifically described.

What is claimed is:

1. An intermittent drive mechanism comprising a housing, recess means formed in said housing, first capstan means journaled in said housing recess means for uni-directional rotation, second capstan means journaled in said housing recess means for uni-directional rotation similar to said first capstan means, flexible, endless tape means looped loosely over said capstans and drivingly connected thereto, first and second fluid port means disposed in said housing intermediate said capstans, each of said fluid port means being disposed along respective parallel lines tangent to the peripheries of said capstans and disposed in opposing relation to each other, and exhaust port means disposed intermediate said capstans adjacent to and on opposite sides of the center line between said two capstans.

2. An intermittent drive mechanism as set forth in claim 1 further comprising brake means disposed adjacent to said exhaust port means to prevent override of said tape means.

3. An intermittent drive mechanism as set forth in claim 1 wherein said recess is provided with a cover means and wherein said tape means has a width substantially equal to the depth of said recess means.

4. An intermittent drive mecahnism as set forth in claim 3 further comprising output means connected to at least one of said capstan means.

5. An intermittent drive mechanism as set forth in claim 2 wherein said brake means is comprised of a lever pivotally mounted in said recess means, pad means mounted on one end of said lever and disposed adjacent said exhaust port means for contact with said tape means, a brake element mounted on the opposite end of said lever and disposed adjacent the periphery of one of said capstan means for braking engagement therewith upon movement of said pad means by said tape means.

No references cited.

EVERETTE A. POWELL, JR., *Primary Examiner.*